US012517027B2

United States Patent
(12) Monden et al.

(10) Patent No.: US 12,517,027 B2
(45) Date of Patent: Jan. 6, 2026

(54) METHOD OF INSPECTING LUBRICATING OIL COMPOSITION AND METHOD OF PRODUCING LUBRICATING OIL COMPOSITION

(71) Applicant: SHOWA DENKO K.K., Tokyo (JP)

(72) Inventors: Ryuji Monden, Tokyo (JP); Yasuyuki Sakaguchi, Tokyo (JP); Hitomi Kane, Tokyo (JP); Kunio Kondo, Tokyo (JP)

(73) Assignee: MITSUBISHI CORPORATION, Tokyo (JP)

( * ) Notice: Subject to any disclaimer, the term of this patent is extended or adjusted under 35 U.S.C. 154(b) by 762 days.

(21) Appl. No.: 17/526,346

(22) Filed: Nov. 15, 2021

(65) Prior Publication Data

US 2022/0074840 A1 Mar. 10, 2022

Related U.S. Application Data

(63) Continuation-in-part of application No. PCT/JP2020/019104, filed on May 13, 2020.

(30) Foreign Application Priority Data

May 16, 2019 (JP) ................................ 2019-092842

(51) Int. Cl.
*G01N 15/02* (2024.01)
*G01N 33/28* (2006.01)

(52) U.S. Cl.
CPC ......... *G01N 15/02* (2013.01); *G01N 33/2835* (2013.01); *G01N 33/2888* (2013.01)

(58) Field of Classification Search
None
See application file for complete search history.

(56) References Cited

U.S. PATENT DOCUMENTS

2007/0137282 A1* 6/2007 Roby ........................ G01N 3/56 73/10
2011/0135061 A1* 6/2011 Thunemann ......... G01N 23/201 977/773

(Continued)

FOREIGN PATENT DOCUMENTS

CN 102099449 A 6/2011
CN 102827673 A 12/2012

(Continued)

OTHER PUBLICATIONS

Jiang, Tribological behavior of a novel fullerene complex, 2008 (Year: 2008).*

(Continued)

*Primary Examiner* — Bradley R Spies
*Assistant Examiner* — Jeannie McDermott
(74) *Attorney, Agent, or Firm* — Sughrue Mion, PLLC

(57) ABSTRACT

The invention provides a method of inspecting a lubricating oil composition and a method of producing a lubricating oil composition. The inspecting method is capable of stably reproducing wear resistance characteristics by using a relatively easy measuring method even in the case where the lubricating oil composition contains a fullerene. In the method of inspecting the lubricating oil composition, the particle size (r) of particles present in the lubricating oil composition containing a base oil and fullerene is measured, and the lubricating oil composition is sorted on the basis of a predetermined range of the particle size (r) set by the relationship between the measured value of the particle size (r) and the measured value of the wear coefficient of the lubricating oil composition.

20 Claims, 2 Drawing Sheets

(56) References Cited

U.S. PATENT DOCUMENTS

| | | | |
|---|---|---|---|
| 2011/0170659 A1 | 7/2011 | Ohzu et al. | |
| 2014/0134092 A1* | 5/2014 | Shankman | B82Y 30/00 423/448 |
| 2018/0037842 A1 | 2/2018 | Suetsugu et al. | |
| 2019/0032971 A1 | 1/2019 | Ishida et al. | |
| 2021/0261878 A1* | 8/2021 | Kimoto | C10M 169/04 |

FOREIGN PATENT DOCUMENTS

| | | | |
|---|---|---|---|
| CN | 103820193 | A | 5/2014 |
| CN | 104560307 | A | 4/2015 |
| CN | 107207993 | A | 9/2017 |
| EP | 3 722 805 | A1 | 10/2020 |
| JP | 2003-139680 | A | 5/2003 |
| JP | 2006-113042 | A | 4/2006 |
| JP | 2008-164294 | A | 7/2008 |
| JP | 2008-266501 | A | 11/2008 |
| JP | 2011-145162 | A | 7/2011 |
| JP | 2013-234869 | A | 11/2013 |
| JP | 2018-168356 | A | 11/2018 |
| JP | 2019-45390 | A | 3/2019 |
| WO | 2017/141825 | A1 | 8/2017 |
| WO | 2019082883 | A1 | 5/2019 |

OTHER PUBLICATIONS

Xing, Dispersion of Fullerene C60 in Mineral Based, 2014 Refrigeration Oils (Year: 2014).*

Yao, Tribological property of onion-like fullerenes as lubricant additive, 2008 (Year: 2008).*

Qu Lei et al., "Structural Characteristics of Methanol/Biodiesel Combustion Particles", Journal of Xi' An Jiaotong University, May 2016, vol. 50, No. 5, pp. 81-86 (6 pages total).

"Industrial Lubricants", JXTG Nippon Oil & Energy, 29 pgs., <URL: http://www.noe.ixtg-group.co_jp/english/products/lubricants/industrial.html>, accessed May 15, 2019.

O. Glatter et al., "Small Angle X-ray Scattering", Academic Press, London, 1982, pp. 17-51.

International Search Report for PCT/JP2020/019104 dated, Aug. 18, 2020 (PCT/ISA/210).

* cited by examiner

METHOD OF INSPECTING LUBRICATING OIL COMPOSITION AND METHOD OF PRODUCING LUBRICATING OIL COMPOSITION

TECHNICAL FIELD

The present invention relates to a method of inspecting a lubricating oil composition and a method of producing a lubricating oil composition.

This application claims priority under Japanese Patent Application No. 2019-092842, filed May 16, 2019, the contents of which are incorporated herein.

BACKGROUND TECHNOLOGY

In recent years, there has been a strong demand for improving the performance of lubricating oils used in automobiles, home appliances, industrial machinery, and the like, in accordance with improvements in speed, efficiency, and energy conservation. In order to improve the properties to suit the application, lubricating oils are formulated with a variety of additives such as antioxidants, extreme pressure additives, anti-rust additives, corrosion inhibitors, and the like.

In order to meet these requirements and at the same time improve performances such as low friction, high torque, and low fuel consumption, there is known an additive composition for engine lubricating oils, which comprises a lubricating base oil such as mineral oil and ester oil, and nanocarbon particles such as fullerenes in which an organic solvent, a viscosity index improver, a friction modifier, and a detergent dispersant are added (for example, see Patent Document 1).

In order to meet these requirements, there is a need for a lubricating oil composition in which performances such as low friction, high torque, low fuel consumption and the like can be improved at the same time. As such a lubricating oil composition, there is known an additive composition for an engine lubricating oil, which comprises a lubricating base oil such as mineral oil and ester oil, and nanocarbon particles such as fullerenes in which an organic solvent, a viscosity index improver, a friction modifier, and a detergent dispersant are added (for example, see Patent Document 1.)

In addition, a fullerene may be added to a lubricating oil composition used in a refrigerant compressor (for example, see Patent Document 2).

Generally, a wear coefficient is an important characteristic of the lubricating oil composition. However, measuring the wear coefficient takes a lot of time and effort. Therefore, in the method of producing the lubricating oil composition, the properties of the lubricating oil composition are determined by using an index that is easy to measure. As the index, for example, a density, a kinematic viscosity, a viscosity index, a flow point, a total acid value, or the like can be used (for example, see Non-Patent Document 1).

[Patent Document 1] Japanese Unexamined Patent Application Publication No. 2008-266501

[Patent Document 2] WO 2017/141825

[Non-Patent Document 1] Internet URL: https://www-.noe.jxtg-group.co.jp/english/products/lubricants/industrial.html

SUMMARY OF THE INVENTION

Problems to be Solved by Invention

However, in a composition obtained by adding a fullerene to the lubricating oil composition, which is described in Non-Patent Document 1 or the like, even if the product management is carried out according to the index described above, a product which stably reproduces lubrication characteristics such as wear coefficient cannot be obtained. In other words, even if the product characteristics were quantified using the above indices and a product within a predetermined range of the indices was judged acceptable, the lubrication characteristics sometimes varied beyond the allowable range.

Further, it is possible to sort a product having the lubrication characteristics within an allowable range by measuring the lubrication characteristics of the product of the lubricating oil composition. However, for this purpose, it is necessary to perform a wear test such as a ball-on-disk or the like for each product lot. In this case, since it takes a lot of time and effort and increases the cost of the test substrate, etc., it is not suitable to carry out the wear test for each product lot.

The present invention has been made in view of the above circumstances, and an object of the present invention is to provide a method of inspecting a lubricating oil composition and a method of producing a lubricating oil composition, the inspecting method can stably reproduce wear resistance characteristics by using a method which is relatively easy to measure even in a case where the lubricating oil composition contains a fullerene.

Means for Solving Problems

The present invention provides the following means for solving the above problems.

[1] A method of inspecting a lubricating oil composition, the method comprising:

measuring the particle size (r) of particles present in the lubricating oil composition containing a base oil and a fullerene, and sorting the lubricating oil composition on the basis of a predetermined range of the particle size (r) set by a relationship between the measured value of the particle size (r) and a measured value of a wear coefficient of the lubricating oil composition.

[2] The method of inspecting the lubricating oil composition according to [1], wherein the particle size (r) of the particles is measured by a dynamic light scattering method, a laser diffraction method, or a small-angle X-ray scattering (SAXS) method.

[3] The method of inspecting the lubricating oil composition according to [1] or [2], wherein the particle size (r) is an average particle size (R) of particles present in the lubricating oil composition.

[4] The method of inspecting the lubricating oil composition according to [3], wherein the average particle size (R) of the particles is measured by a small-angle X-ray scattering (SAXS) method.

[5] The method of inspecting the lubricating oil composition according to [4], wherein the average particle size (R) of the particles is calculated from the slope of a Guinier plot.

[6] The method of inspecting the lubricating oil composition according to [4], wherein the average particle size (R) of the particles is calculated from a value of a scattering vector at which the scattering intensity ratio between the lubricating oil composition and the base oil is the maximum value with respect to the scattering vector.

[7] A method of producing a lubricating oil composition, the method comprising a step of sorting a lubricating oil composition by using the method of inspecting the lubricating oil composition according to any one of [1] to [6].

Effect of the Invention

According to the present invention, it is possible to provide a method of inspecting a lubricating oil composition and a method of producing the lubricating oil composition, and the inspecting method is capable of stably reproducing wear resistance characteristics by using a method which is relatively easy to measure, even in the case where the lubricating oil composition contains a fullerene.

DESCRIPTION OF THE INVENTION

Figure 1:
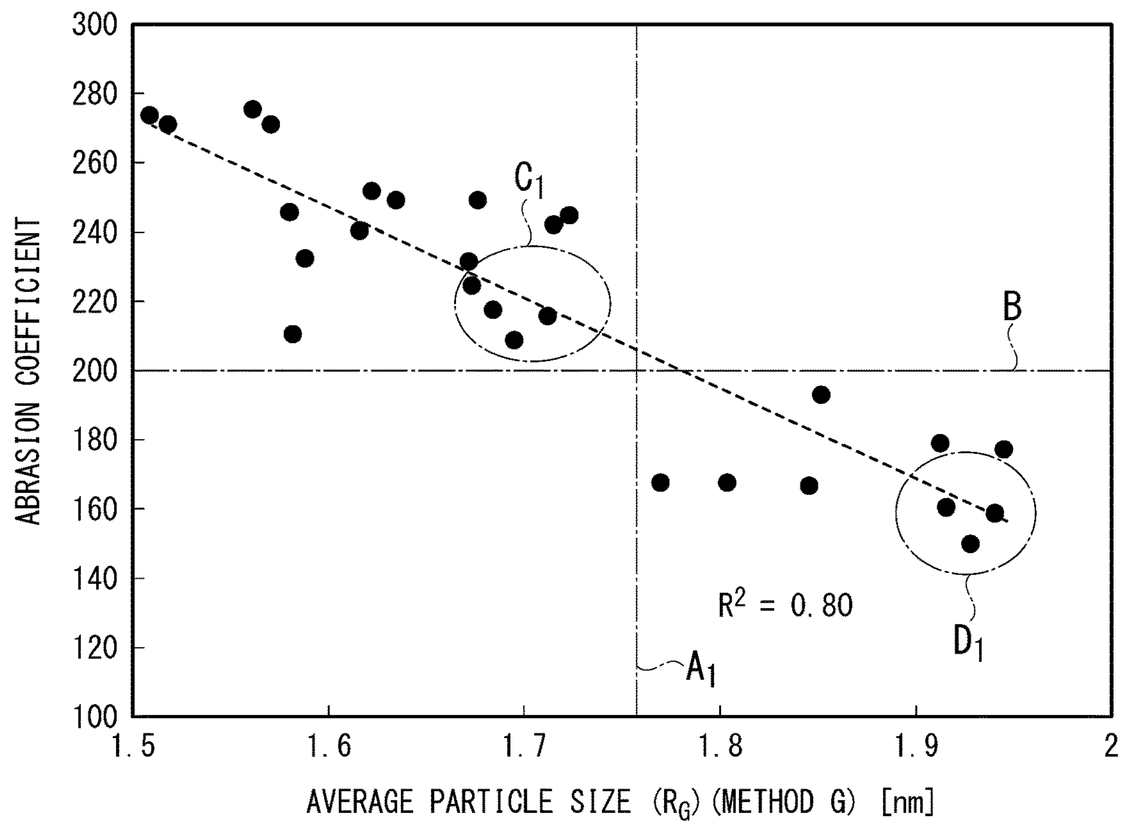
FIG. 1 shows the relationship between the average particle sizes ($R_G$) of the particles obtained by the G method and the wear coefficients.

Hereinafter, a method of inspecting a lubricating oil composition and a method of producing the lubricating oil composition according to an embodiment of the present invention will be described. It is to be noted that the present embodiment is for the purpose of providing a better understanding of the object of the present invention and is not intended to limit the present invention unless otherwise specified.

[Method of Inspecting Lubricating Oil Composition]

The method of inspecting the lubricating oil composition according to the present embodiment includes measuring a particle size (r) of a particle present in the lubricating oil composition containing a base oil and a fullerene (hereinafter referred to as the particle size (r)), and sorting the lubricating oil composition on the basis of a predetermined range set by the relationship between the measured value of the particle sizes (r) and the measured value of the wear coefficients of the lubricating oil composition. That is, the method of inspecting the lubricating oil composition according to the present embodiment includes the following three steps.

First Step: measuring particle sizes (r) of particles present in the plurality of lubricating oil compositions and the wear coefficients of the lubricating oil compositions, and calculating a relationship between the particle sizes (r) and the wear coefficients (for example, an approximated straight line of wear coefficients (B)–particle sizes (r): B=kR+c).

Second Step: setting a predetermined range of the particle sizes (r).

Third step: measuring the particle sizes (r) of the particles present in the lubricating oil compositions to be inspected, and if a particle size (r) is within the predetermined range, the product is judged acceptable, and if a particle size (r) is outside the predetermined range, the product is judged rejected.

Preferably, the particle size (r) is an average particle size (R) of the particles present in the lubricating oil composition (hereinafter referred to as the average particle size (R)).

(Lubricating Oil Composition)

The lubricating oil composition to be inspected by the method of inspecting the lubricating oil composition according to the present embodiment includes a base oil and a fullerene.

(Base Oil)

The base oil contained in the lubricating oil composition of the present embodiment is not particularly limited, and a mineral oil or a synthetic oil which is widely used as a base oil for a lubricating oil is suitably used.

The mineral oils used as lubricating oils are generally those in which the double bonds contained therein are saturated by hydrogenation and converted into saturated hydrocarbons. Examples of such mineral oils include paraffinic base oils and naphthenic base oils.

As synthetic oils, synthetic hydrocarbon oils, ether oils, ester oils, and the like may be used. Specifically, poly $\alpha$-olefin, diester, polyalkylene glycol, polyalkylvinyl ether, polybutene, isoparaffin, olefin copolymer, alkylbenzene, alkylnaphthalene, diisodecyl adipate, monoester, dibasic acid ester, tribasic acid ester, polyol ester (trimethylolpropane caprylate, trimethylolpropane pelargonate, pentaerythritol 2-ethylhexanoate, pentaerythritol pelargonate, or the like), dialkyl diphenyl ether, alkyl diphenyl sulfide, polyphenyl ether, silicone lubricating oil (dimethyl silicone, or the like), perfluoropolyether, and the like are preferably used. Among these, poly $\alpha$-olefins, diesters, polyol esters, polyalkylene glycols, and polyalkyl vinyl ethers are more preferably used.

One kind of mineral oil or synthetic oil may be used alone, or two or more kinds sorted from the mineral oil or synthetic oil may be mixed at an arbitrary ratio.

(Fullerene)

The fullerene contained in the lubricating oil composition of the present embodiment is not particularly limited in structure or manufacturing method, and various fullerenes can be used. Examples of fullerenes include $C_{60}$ and $C_{70}$ which are relatively easy to obtain, higher order fullerenes, or mixtures thereof. Among the fullerenes, $C_{60}$ and $C_{70}$ are preferable from the viewpoint of high solubility in the base oil, and $C_{60}$ is more preferable from the viewpoint of less coloring in the base oil. In the case of a mixture of $C_{60}$ and $C_{70}$, $C_{60}$ is preferably contained in an amount of 50 mass % or more.

The fullerene may be chemically modified for the purpose of further enhancing solubility in the base oil. Examples of chemically modified fullerenes include a phenyl $C_{61}$ butyric acid methyl ester ([60] PCBM), a diphenyl $C_{62}$ dibutyric acid methyl ester (Bis [60] PCBM), a phenyl $C_{71}$ butyric acid methyl ester ([70] PCBM), a phenyl $C_{85}$ butyric acid methyl ester ([85] PCBM), a phenyl $C_{61}$ butyric acid butyl ester ([60] PCBB), a phenyl $C_{61}$ butyric acid octyl ester ([60] PCBO), an indene adduct of a fullerene, a pyrrolidine derivative of a fullerene, and the like.

(Additives)

The lubricating oil composition according to the present embodiment can contain an additive other than the base oil and the fullerene within a range that does not impair the effect of the present embodiment.

The additive to be blended in the lubricating oil composition of the present embodiment is not particularly limited. Examples of the additives include a commercially-available antioxidant, a viscosity index improver, an extreme pressure additive, a detergent dispersant, a pour point depressant, a corrosion inhibitor, a solid lubricating oil, an oil improver, an anti-rust additive, an antiemulsifier, a defoaming agent, a hydrolysis inhibitor, and the like. One or more of these additives may be used alone or in combination.

Examples of the antioxidant include dibutylhydroxytoluene (BHT), butylhydroxyanisole (BHA), 2, 6-di-tert-butyl-p-cresol (DBPC), 3-arylbenzofuran-2-one (intramolecular cyclic esters of hydroxycarboxylic acids), phenyl-α-naphthylamine, dialkyldiphenylamine, benzotriazole, and the like.

Examples of the viscosity index improver include a polyalkylstyrene and a hydride additive of a styrene-diene copolymer.

Examples of the extreme-pressure additive include dibenzyl disulfide, allyl phosphate ester, allyl phosphite ester, amine salt of allyl phosphate ester, allyl thiophosphate ester, amine salt of allyl thiophosphate ester, naphthenic acid, and the like.

Examples of the detergent dispersant include benzylamine succinic acid derivatives, alkylphenol amines, and the like.

Examples of the pour point depressant include a chlorinated paraffin-naphthalene condensate, a chlorinated paraffin-phenol condensate, a polyalkylstyrene system, and the like Examples of the antiemulsifier include alkylbenzene sulfonate.

Examples of the corrosion inhibitor include dialkyl naphthalene sulfonate and the like.

The lubricating oil composition of the present embodiment can be used for various applications such as an industrial gear oil; hydraulic fluid; compressor oil; refrigerating machine oil; cutting oil; plastic working oil such as rolling oil, press oil, forging oil, drawing oil, pulling out oil and punching oil; metal processing oil such as heat treatment oil and electric discharge processing oil; sliding guide oil; bearing oil; rust preventive oil; heating medium oil; or the like.

(Measurement of Particle Size (r))

Particles in the lubricating oil composition according to the present embodiment include, for example, fullerene-derived particles such as aggregates of fullerenes, and complexes of fullerenes and base oil molecules. The method of measuring the particle size (r) of the particles may be any method capable of measuring the particle size in the nanometer range. Specifically, for example, a dynamic light scattering method, a laser diffraction method, a small-angle X-ray scattering method and the like can be used. Since it is estimated that many of the particles present in the lubricating oil composition of the present embodiment have a particle size in the range of 1 nm to 100 nm, it is preferable to use the small-angle X-ray scattering method (hereinafter referred to as the SAXS method).

In each of the measuring methods, it is preferable that the measured particle size (r) is an average particle size (R), from the viewpoint that a strong relationship between the particle size (r) and the wear coefficient can be easily obtained.

In the small-angle X-ray scattering method, the particle sizes and distribution of the particles in the lubricating oil composition can be obtained by analyzing an intensity of scattered X-rays from the particles in the lubricating oil composition. As a region where the scattered X-ray is generated, for example, in the case of an X-ray having a wavelength of 1.54 Å using a Cu target, the range of measurement angles 2θ is 0.1 to 10 degrees. A basic principle of the small-angle X-ray scattering method can be found in the book "Glatter & Kratky eds (1982) Small-Angle X-Ray Scattering, Academic Press, London (1982), Pages 17-51."

In order to measure the average particle size (R) of the particles in the lubricating oil composition, first, an X-ray scattering intensity profile of the particles in the lubricating oil composition is determined by the SAXS method. The vertical axis of the X-ray scattering intensity profile of the particles is the X-ray scattering intensity $I^{SAXS}$ (Q), and the horizontal axis is the scattering vector Q ($nm^{-1}$) which depends on the measurement angle 2θ and a wavelength λ. The value of the scattering vector Q is defined by the following equation (1). Subsequently, the following G or S method is used to calculate the average particle size (R) of the particles in the lubricating oil composition.

[Equation 1]

$$|Q| = 2k\sin\theta = \left(\frac{4\pi}{\lambda}\right)\sin\theta \tag{1}$$

[Method G]

In the lubricating oil composition, assuming that an electron density difference of particles with respect to the base oil is constant, the particle shape is spherical, and the particle size (r) is uniform, Guinier approximation can be used in the small angle region of $Q<1/r$. According to the Guinier approximation, the scattering intensity $I^{SAXS}$ (Q) of the particles can be expressed by the following equation (2):

[Equation 2]

$$I^{SAXS}(Q) \approx (\Delta\rho)^2 V_p^2 \exp\left(-\frac{Q^2 r^2}{5}\right) \tag{2}$$

In the equation (2), $I^{SAXS}$ (Q) is the scattering intensity of the particles, Δρ is the electron density difference of the particles with respect to the base oil, and $V_p$ is the volume of the particles.

On the basis of the scattering intensity profile of particles in the lubricating oil composition obtained by SAXS measurement, Guinier plot which has a vertical axis of Log $I^{SAXS}$ (Q) and a horizontal axis of $Q^2$ is obtained, and as a result, the average particle size (R) of particles can be obtained from the slope of the straight line.

[S Method]

In the Guinier approximation, it is sometimes necessary to make assumptions such as the shape of particles and the like, but from the viewpoint that these assumptions are not necessary, it is preferable to analyze the average particle size of particles by using the simpler S method.

In the S method, an X-ray scattering intensity profile of the particles in the lubricating oil composition measured by the SAXS method and an X-ray scattering intensity profile of the base oil can be obtained. The ratio of the X-ray scattering intensity of the particles to the X-ray scattering intensity of the base oil with respect to the scattering vector Q is obtained, and the average particle size (R) of the particles can be calculated by the following equation (3) using a scattering vector $Q_{max}$ in which the X-ray scattering intensity ratio becomes the maximum value.

[Equation 3]

$$R=2\pi/Q_{max} \tag{3}$$

In the method of inspecting the lubricating oil composition of the present embodiment, the average particle size (R) of the particles is calculated from the X-ray scattering intensity profile by the SAXS method described above. The sorting accuracy can be further improved by sorting the lubricating oil composition in which the value calculated from the SAXS method is within a set predetermined range. As a result, the wear resistance characteristics of the lubricating oil composition can be more stably predicted.

In the method of inspecting the lubricating oil composition according to the present invention, the calculation of the average particle size (R) of the particles may be performed by the G method alone, the S method alone, or the G method and the S method at the same time. When used at the same time, for example, it is possible to set the average particle sizes (R) calculated by the two methods within each predetermined range as a sorting criterion. In this case, the accuracy of sorting the lubricating oil composition can be improved.

[Method of Producing Lubricating Oil Composition]

The method of producing the lubricating oil composition of the present embodiment includes a step of sorting a lubricating oil composition obtained by mixing a base oil and a fullerene by the method of inspecting the lubricating oil composition of the present embodiment.

The method of producing the lubricating oil composition of the present embodiment preferably includes the following steps in detail.

(1) A step of obtaining a lubricating oil composition containing a base oil and a fullerene by mixing the base oil and the fullerene, dissolving a dissolved component of the fullerene in the base oil, and performing filtration, heat treatment, etc., if necessary (hereinafter referred to as "dissolving step").

(2) A step of sorting the lubricating oil compositions by calculating the average particle size (R) of the lubricating oil composition from the X-ray scattering intensity profile via the SAXS method, and determining that the lubricating oil composition having the value within a predetermined range is an acceptable lubricating oil composition or that the lubricating oil composition having the value outside the predetermined range is a rejected lubricating oil composition (hereinafter referred to as "inspecting step").

The method of producing the lubricating oil composition of the present embodiment may further include the following step, if necessary.

(3) A step of obtaining a new lubricating oil composition by mixing lubricating oil compositions produced in a plurality of different batches so that a resultant lubricating oil composition can be sorted as an acceptable one in the inspecting step (hereinafter referred to as the "readjusting step").

Hereinafter, a method of producing the lubricating oil composition of the present embodiment will be described in detail.

(Dissolving Step)

The fullerene as a raw material is charged into the base oil, and a dispersing method such as a stirrer or the like is used to disperse the fullerene for 1 hour to 48 hours at near room temperature or by heating as required.

Examples of the dispersing method for dispersing the fullerene in the base oil include a stirrer, an ultrasonic disperser, a homogenizer, a ball mill, a bead mill, and the like.

Thus, a liquid in which fullerenes are dissolved or dispersed in the base oil (hereinafter referred to as "fullerene solution") is obtained.

The charging amount of the fullerene may be such an amount that the fullerene concentration of the fullerene solution becomes a desired value. When a step for removing insoluble components described later is provided during the dissolving step, fullerenes may be added in a larger amount than the above-mentioned amount, in consideration of the amount of fullerenes removed by the step. Although the fullerene concentration depends upon the solvents, in general, the fullerene concentration of the fullerene solution, in which the fullerene is hardly precipitated as an insoluble component, is preferably in the range of 1 ppm by mass to 1% by mass.

A fullerene solution having a desired concentration may be obtained by obtaining a fullerene solution having a higher concentration than the desired one, and then diluting the solution with a base oil.

The fullerene solution thus obtained may be used as the lubricating oil composition as it is.

Further, it is preferable that a step for removing the insoluble component is provided during the dissolving step, and the fullerene solution from which the insoluble component is removed is used as the lubricating oil composition. The step of removing the insoluble component is preferably provided after the dispersion treatment of dispersing the fullerene in the base oil in the dissolving step. Examples of the step of removing the insoluble component include (1) a removing step using a membrane filter, (2) a removing step using a centrifuge, and (3) a removing step using a combination of the membrane filter and the centrifuge. Among these removing steps, from the viewpoint of filtration time, (1) a removing step using a membrane filter is preferable when a small amount of the lubricating oil composition is obtained, and (2) a removing step using a centrifuge is preferable when a large amount of the lubricating oil composition is obtained.

In the dissolving step, particularly when the fullerene solution is heated, it is preferable to perform the dissolving step in a non-oxidizing atmosphere. For example, it is preferable that the fullerene solution is brought into equilibrium with the inert gas by replacing the inside of the container housing the fullerene solution with the inert gas such as nitrogen gas or argon gas or by bubbling the fullerene solution in the container with the inert gas.

(Inspecting Step)

The inspecting step is a step of calculating the average particle size (R) of the particles in the lubricating oil composition and sorting the lubricating oil composition. The average particle size (R) of the particles in the lubricating oil composition is calculated from the X-ray scattering intensity profile of the lubricating oil composition obtained in the dissolving step by the SAXS method. A lubricating oil composition having an average particle size (R) within a predetermined range is sorted as an acceptable product and a lubricating oil composition outside the predetermined range is sorted as a rejected product. The predetermined range of the average particle size (R) can be set by obtaining the average particle size (R) in which the wear coefficient is within a desired range from the relationship between the wear coefficient of the lubricating oil composition and the average particle size (R), as described above. The average particle size (R) is measured for each lubricating oil composition produced in a plurality of different batches. Thus, the predetermined range of the average particle size (R) is determined in consideration of the wear resistance characteristics, and the lubricating oil compositions can be sorted into an acceptable product and a rejected product.

(Readjusting Step)

The readjusting step is a step of obtaining an acceptable lubricating oil composition by mixing an appropriate amount of the rejected lubricating oil composition into the acceptable lubricating oil composition. For example, the average particle size (R) of the particles in the newly prepared lubricating oil composition is measured again in the inspecting step, and an appropriate amount is mixed so that the measured value falls within a predetermined range to obtain an acceptable lubricating oil composition. The amount of the lubricating oil composition of the rejected product to be mixed with the acceptable product may be determined by measuring the average particle size (R) of the particles in the resultant lubricating oil composition after mixing.

The following effects can be obtained by sorting the lubricating oil composition. (1) The lubricating oil composition in which the average particle size (R) of the particles is rejected can be removed. (2) A lubricating oil composition which can be newly accepted can be obtained by mixing a lubricating oil composition in which the average particle size (R) of the particles is within a rejected range with a lubricating oil composition of an acceptable product.

As described above, according to the method of producing the lubricating oil composition of the present embodiment, even in the case where the lubricating oil composition contains a fullerene, wear resistance can be predicted by using a method that is relatively easy to measure, and the lubricating oil composition can be accurately sorted into an acceptable product and a rejected product. The above method is a method of measuring the average particle size (R) of particles in a lubricating oil composition via the SAXS method.

Although the preferred embodiment of the present invention has been described in detail above, the present invention is not limited to a specific embodiment, and various modifications and variations are possible within the scope of the gist of the present invention described in the claims.

EXAMPLES

The present invention will now be described in more detail by way of examples and comparative examples, but the present invention is not limited to the following examples.

[Preparation of Lubricating Oil Composition]

A mineral oil A (product name: Diana Frescia P-46, manufactured by Idemitsu Kosan Co., Ltd.) 2 L and a fullerene (Frontier Carbon, Nanom™ purple SUT, $C_{60}$) were mixed at the following amounts, and the mixture was stirred with a stirrer at room temperature for 6 hours. After stirring, the solution was filtered through a 0.1 μm membrane filter to obtain a fullerene solution. Here, 0.5 mg, 5.0 mg, and 50.0 mg of the fullerene were added to the mineral oil to prepare 3 kinds of fullerene solutions having fullerene concentrations of 2.5 ppm by mass, 25.0 ppm by mass, and 250.0 ppm by mass, respectively. The fullerene concentrations in the solutions were calculated from the charge amounts of the fullerene.

Further, 100 ml of the obtained fullerene solution was taken out and transferred to a 250 ml stainless steel pressure vessel. Next, the inside of the vessel was replaced with nitrogen gas, and then the vessel was capped tightly without a heat treatment. Alternatively, the vessel was immersed in an oil bath at 150° C. for 2 hours or 15 hours with a heat treatment. Nine lubricating oil compositions of the lubricating oil compositions 1 to 9, as shown in Table 1, were obtained. Each kind of lubricating oil composition was prepared at 3 points, and then a total of 27 samples were prepared.

TABLE 1

| Lubricating oil composition | Heat treatment condition | Fullerene concentration (ppm by mass) |
|---|---|---|
| 1 | None | 2.5 |
| 2 | None | 25.0 |
| 3 | None | 250.0 |
| 4 | 150° C., 2 hours | 2.5 |
| 5 | 150° C., 2 hours | 25.0 |
| 6 | 150° C., 2 hours | 250.0 |
| 7 | 150° C., 15 hours | 2.5 |
| 8 | 150° C., 15 hours | 25.0 |
| 9 | 150° C., 15 hours | 250.0 |

[Measure Method]

(Small-Angle X-Ray Scattering Measurement)

Small-angle X-ray scattering measurements were performed on the lubricating oil compositions. Details are shown as below.

Measurement System: SAXSpace (manufactured by AntonPaar)

X-ray: wavelength (λ): 0.1524 nm

Detector: Mythen (one-dimensional counting detector)

After selecting appropriate exposure conditions (attenuator and exposure time), a first two-dimensional scattering pattern of the lubricating oil composition and a second two-dimensional scattering pattern of the base oil (background) were recorded. Using the image processing software Fit2d (European Synchrotron Research Facility), a first and a second scattering intensity profile having the horizontal axis of the scattering vector and having the vertical axis of the scattering intensity were obtained from the first and the second two-dimensional scattering patterns, respectively. The scattering intensity profile of the particles can be obtained by subtracting the scattering intensity of the base oil from the scattering intensity of the lubricating oil composition.

(Measurement of Wear Coefficient)

The wear resistance characteristics of each obtained lubricating oil composition was evaluated using a friction and wear testing machine (Ball-on-disk tribometer manufactured by Anton Paar).

A substrate and a ball constituting the friction and wear testing machine are made of SUJ2, a high-carbon chromium bearing steel. A diameter of the ball used was 6 mm and a size of the substrate used was 15 mm square.

First, a lubricating oil composition was applied to one main surface of the substrate. Then, the ball was slid on the one main surface of the substrate via the lubricating oil composition so that the ball drew a concentric orbit. The speed of the ball on the one main surface of the substrate is 20 mm/sec, and a load on the one main surface of the substrate by the ball is 25 N. When a sliding distance of the ball on the one main surface of the substrate reached a value of 15 m in total, the ball was taken out of the apparatus. The contact surface of the ball with the substrate was observed using an optical microscope, and the maximum diameter of the circle of the worn surface was set to D (μm). The maximum diameter D is defined as the wear coefficient. In other words, the smaller the number of the maximum diameter D is, the more wear is suppressed and the condition is favorable as a lubricating characteristic of the lubricating oil composition. It is usually worn in a round shape but may have an oval shape. In this case, the portion having the maximum diameter is defined as the maximum diameter D. This measurement was carried out in an environment of 25±2° C.

(Measurement of Kinematic Viscosity)

About 50 mL of the lubricating oil composition was removed into a glass beaker and the glass beaker was immersed in a 40° C. water bath for 30 minutes.

Next, the kinematic viscosity of the lubricating oil composition was measured by a method conforming to the viscosity measurement method using a capillary viscometer specified in JIS Z 8803: 2011.

Example 1

For the 27 samples of the lubricating oil compositions and the base oil (mineral oil A), small-angle X-ray scattering measurements were performed to obtain scattering intensity profiles of particles. In the small-angle X-ray scattering measurement of the 27 samples of the lubricating oil composition, using each scattering intensity profile of the obtained particles, an average particle size ($R_G$) was calculated by the G method. In the small-angle X-ray scattering measurement of the base oil (mineral oil A), since no particle was observed in the base oil (mineral oil A), the particle size measurement result was not obtained. Then, wear coefficients of the 27 samples of the lubricating oil compositions were measured, and the relationship between the average particle sizes ($R_G$) and the wear coefficients is shown in FIG. 1. The average particle sizes ($R_G$) and wear coefficient values are shown in Table 2.

TABLE 2

| | Lubricating oil | Wear coefficient | | | Average particle size (RG) (Method G) [nm] | | |
|---|---|---|---|---|---|---|---|
| | composition | Sample 1 | Sample 2 | Sample 3 | Sample 1 | Sample 2 | Sample 3 |
| Example 1-1 | 1 | 167 | 168 | 168 | 1.85 | 1.77 | 1.80 |
| Example 1-2 | 2 | 211 | 233 | 245 | 1.58 | 1.59 | 1.72 |
| Example 1-3 | 3 | 217 | 209 | 216 | 1.68 | 1.69 | 1.71 |
| Example 1-4 | 4 | 194 | 177 | 161 | 1.85 | 1.95 | 1.92 |
| Example 1-5 | 5 | 246 | 271 | 272 | 1.58 | 1.52 | 1.57 |
| Example 1-6 | 6 | 241 | 232 | 243 | 1.62 | 1.67 | 1.72 |
| Example 1-7 | 7 | 150 | 179 | 159 | 1.93 | 1.91 | 1.94 |
| Example 1-8 | 8 | 274 | 249 | 276 | 1.51 | 1.64 | 1.56 |
| Example 1-9 | 9 | 249 | 252 | 224 | 1.68 | 1.62 | 1.67 |

From the results shown in FIG. 1, the con-elation coefficient between the average particle sizes ($R_G$) and the wear coefficients was −0.80, and it was confirmed that a correlation between the average particle size (Ru) and the wear coefficient existed. The con-elation coefficient was obtained by a least squares method. A correlation was judged to exist when the absolute value of the correlation coefficient was 0.70 or more. In Example 1, in which a correlation existed, the lubricating oil compositions having a wear coefficient within a desired range can be sorted by sorting the lubricating oil compositions having an average particle size (Ru) within a predetermined range.

For example, in FIG. 1, when the wear coefficient of the lubricating oil composition is equal to or less than the value B (=200), the lubricating oil composition having an average particle size (Ru) which is equal to or greater than the value $A_1$ (=1.75) should be sorted as an acceptable product. In this case, when the average particle size ($R_G$) is set to be equal to or greater than the value $A_1$ as a predetermined range and the lubricating oil composition having the average particle size ($R_G$) equal to or greater than the value $A_1$ is sorted as an acceptable product, it is unlikely to include a rejected product which has a wear coefficient exceeding the value B. In FIG. 1, when the average particle size ($R_G$) of the lubricating oil composition is less than the value $A_1$, the lubricating oil composition having a wear coefficient exceeding the value B can be sorted as a rejected product. In FIG. 1, even in the case of the rejected lubricating oil composition in region $C_1$, if the amount thereof is small, the rejected lubricating oil composition can be readjusted to an acceptable lubricating oil composition having a wear coefficient of less than or equal to the value B by the following method. By adding the acceptable lubricating oil composition in region $D_1$ to the rejected lubricating oil composition, an average particle size ($R_G$) of a resultant lubricating oil composition can become a value $A_1$ or more.

Example 2

The relationship between the average particle sizes ($R_S$) of the particles and the wear coefficients was evaluated in the same manner as in Example 1, except that the average particle sizes ($R_S$) of the particles were calculated by the S method using the scattering intensity profile of the particles and the scattering intensity profile of mineral oil A.

Figure 2:
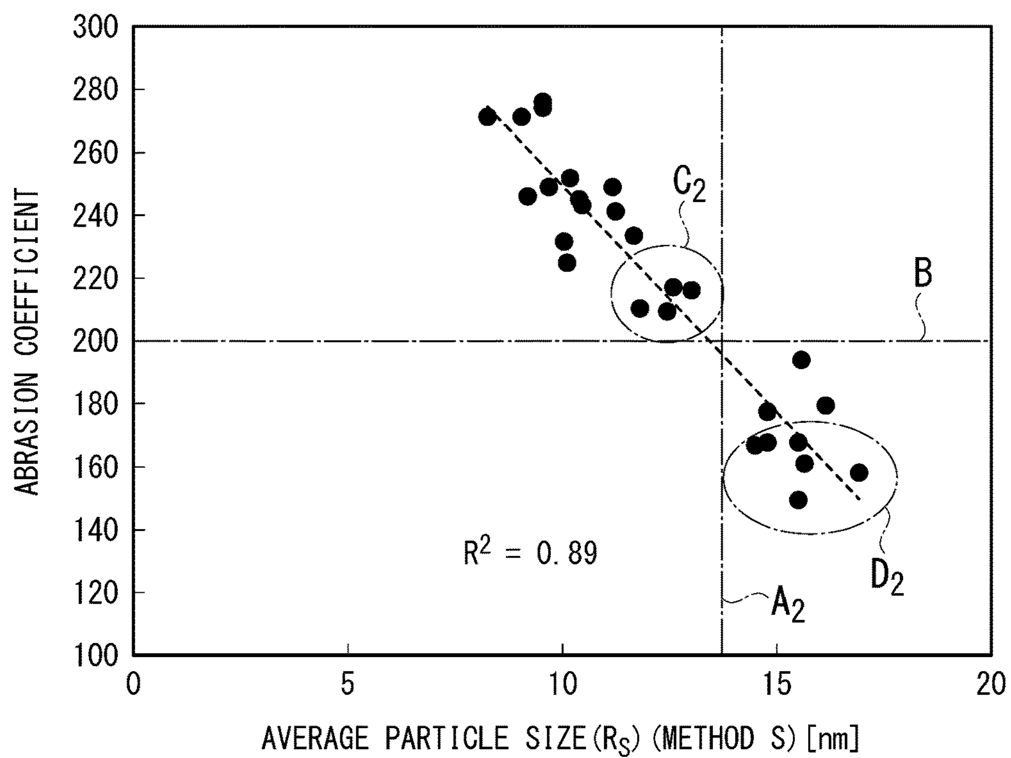
FIG. 2 shows the relationship between the average particle sizes ($R_S$) of the particles obtained by the S method and the wear coefficients.

Table 3 shows the average particle sizes ($R_S$) and wear coefficients, and FIG. 2 shows the relationship between the average particles sizes ($R_S$) and wear coefficients.

TABLE 3

| | Lubricating oil composition | Wear coefficient | | | Average particle size (Rs) (Method S) [nm] | | |
|---|---|---|---|---|---|---|---|
| | | Sample 1 | Sample 2 | Sample 3 | Sample 1 | Sample 2 | Sample 3 |
| Example 2-1 | 1 | 167 | 168 | 168 | 14.5 | 14.7 | 15.4 |
| Example 2-2 | 2 | 211 | 233 | 245 | 11.7 | 11.7 | 10.4 |
| Example 2-3 | 3 | 217 | 209 | 216 | 12.6 | 12.4 | 12.9 |
| Example 2-4 | 4 | 194 | 177 | 161 | 15.5 | 14.7 | 15.6 |
| Example 2-5 | 5 | 246 | 271 | 272 | 9.1 | 9.0 | 8.2 |
| Example 2-6 | 6 | 241 | 232 | 243 | 11.2 | 10.0 | 10.4 |
| Example 2-7 | 7 | 150 | 179 | 159 | 15.4 | 16.1 | 16.9 |
| Example 2-8 | 8 | 274 | 249 | 276 | 9.5 | 9.7 | 9.5 |
| Example 2-9 | 9 | 249 | 252 | 224 | 11.1 | 10.1 | 10.0 |

From the results shown in FIG. 2, the correlation coefficient between the average particle sizes ($R_S$) and the wear coefficients was −0.89, and the absolute value thereof was 0.70 or more, and therefore, it is confirmed that a correlation between the average particle sizes ($R_S$) and the wear coefficients existed. As a result, in Example 2, the lubricating oil composition having a wear coefficient within a desired range can also be sorted as an acceptable product by sorting the lubricating oil composition having an average particle size ($R_S$) within a predetermined range, For example, in FIG. 2, when a wear coefficient of a lubricating oil composition is equal to or less than the value B (=200), the lubricating oil compositions having an average particle size ($R_S$) which is equal to or greater than the value $A_2$ (=13) should be sorted as an acceptable product. In this case, when the average particle size ($R_S$) is set to be equal to or greater than the value $A_2$ as a predetermined range, and the lubricating oil composition having the average particle size ($R_S$) equal to or greater than the value $A_2$ is sorted as an acceptable product, it is unlikely to include a rejected product having a wear coefficient exceeding the value B. In FIG. 2, when the average particle size ($R_S$) of the lubricating oil composition is less than the value $A_2$, the lubricating oil composition having a wear coefficient exceeding the value B can be sorted as a rejected product. In FIG. 2, even in the case of the rejected lubricating oil compositions in region $C_2$, if the amount thereof is small, the rejected lubricating oil composition can be readjusted to an acceptable lubricating oil composition having a wear coefficient of less than or equal to the value B by the following method. By adding an acceptable lubricating oil composition in region $D_2$ to a rejected lubricating oil composition, an average particle size ($R_S$) of a resultant lubricating oil composition can become a value $A_2$ or more.

Comparative Example 1

The dynamic viscosity ($mm^2/s$) and the wear coefficient were measured for the 27 samples of the lubricating oil compositions, and the relationship between the dynamic viscosities and the wear coefficients was evaluated. Table 4 shows the measurement results of kinematic viscosities and wear coefficients, and FIG. 3 shows the relationship between kinematic viscosities and wear coefficients.

TABLE 4

| | Lubricating oil composition | Wear coefficient | | | Kinematic viscosity [$mm^2/s$] | | |
|---|---|---|---|---|---|---|---|
| | | Sample 1 | Sample 2 | Sample 3 | Sample 1 | Sample 2 | Sample 3 |
| Comparative Example 1-1 | 1 | 167 | 168 | 168 | 25.4 | 22.5 | 24.4 |
| Comparative Example 1-2 | 2 | 211 | 233 | 245 | 24.0 | 25.0 | 25.4 |
| Comparative Example 1-3 | 3 | 217 | 209 | 216 | 20.9 | 24.2 | 23.1 |
| Comparative Example 1-4 | 4 | 194 | 177 | 161 | 27.2 | 25.7 | 23.7 |
| Comparative Example 1-5 | 5 | 246 | 271 | 272 | 24.0 | 24.9 | 26.5 |
| Comparative Example 1-6 | 6 | 241 | 232 | 243 | 23.7 | 23.7 | 22.5 |
| Comparative Example 1-7 | 7 | 150 | 179 | 159 | 28.7 | 27.6 | 24.2 |
| Comparative Example 1-8 | 8 | 274 | 249 | 276 | 27.5 | 26.3 | 23.9 |
| Comparative Example 1-9 | 9 | 249 | 252 | 224 | 26.9 | 24.3 | 27.3 |

Figure 3:
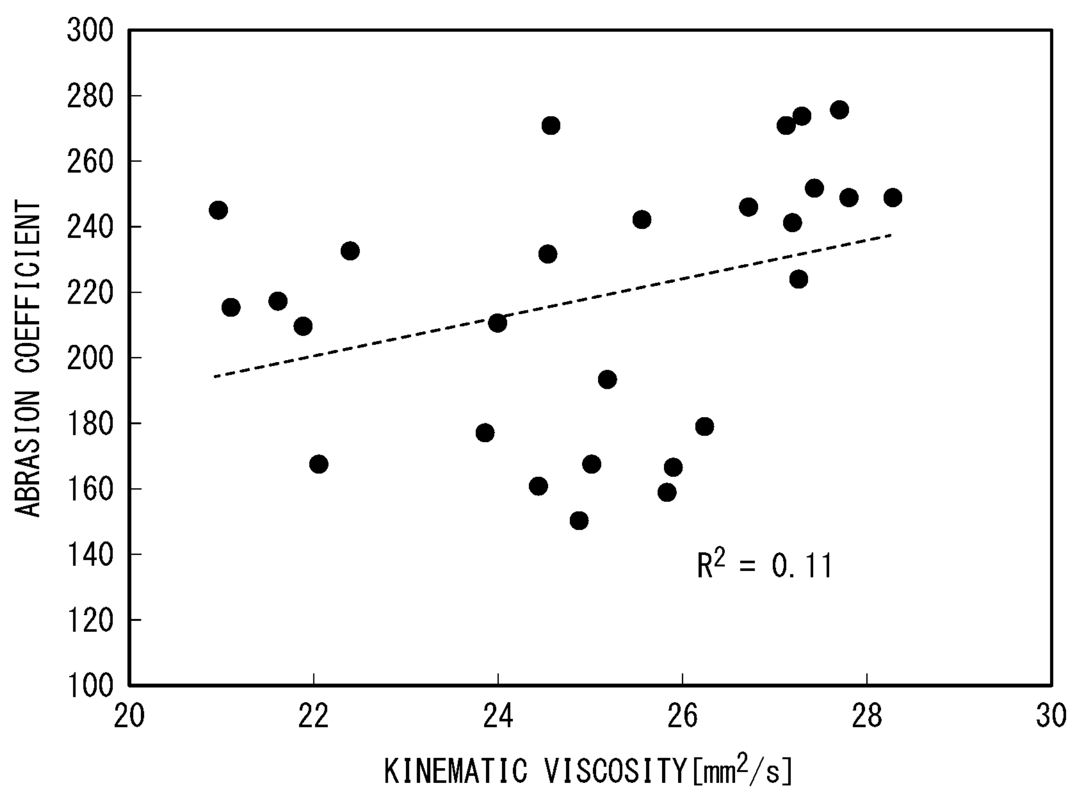
FIG. 3 shows the relationship between the kinematic viscosities and the wear coefficients.

From the results shown in FIG. 3, the correlation coefficient between the kinematic viscosities and the wear coefficients was 0.11, and the absolute value thereof was less than 0.70, so that it was confirmed that no correlation between the kinematic viscosity and the wear coefficient existed. Therefore, it is unlikely that the lubricating oil composition was sorted by estimating the wear coefficient of the lubricating oil composition using the kinematic viscosity of the lubricating oil composition.

INDUSTRIAL APPLICABILITY

In a method of producing a lubricating oil composition containing a base oil and a fullerene, a wear resistance can be predicted and the lubricating oil composition can be accurately sorted into an acceptable product or a rejected product by measuring the average particle size (R) of particles present in the lubricating oil composition. Accordingly, the lubricating oil composition of the acceptable product sorted in the present invention is effective in preventing a metal portion from being damaged or worn in a sliding portion of an automobile, household electric appliance, industrial machine or the like.

The invention claimed is:

1. A method of inspecting a lubricating oil composition, the method comprising:

measuring a particle size (r) of particles present in the lubricating oil composition containing a base oil and a fullerene, thereby obtaining a measured particle size (r), and determining wear resistance characteristics of the lubricating oil composition based on the measured particle size (r) according to a defined relationship between the measured particle size (r) and a measured wear coefficient of the lubricating oil composition, wherein the particles include at least one kind selected from the group consisting of (i) aggregates of fullerenes and (ii) complexes of fullerenes and base oil molecules and the particle size (r) of particles present in the lubricating oil composition is an average particle size (R) of the particles present in the lubricating oil composition.

2. The method according to claim 1, wherein the particle size (r) of the particles is measured by a dynamic light scattering method, a laser diffraction method, or a small-angle X-ray scattering (SAXS) method.

3. The method according to claim 1, wherein the average particle size (R) of the particles is measured by a small-angle X-ray scattering (SAXS) method.

4. The method according to claim 3, wherein the average particle size (R) of the particles is calculated from a slope of a Guinier plot.

5. The method according to claim 3, wherein the average particle size (R) of the particles is calculated from a value of a scattering vector at which the scattering intensity ratio between the lubricating oil composition and the base oil is the maximum value with respect to the scattering vector.

6. A method of producing a lubricating oil composition, the method comprising a step of sorting the lubricating oil composition by using the method according to claim 1.

7. The method according to claim 1, wherein the particles include aggregates of fullerenes.

8. The method according to claim 1, wherein the particles include complexes of fullerenes and base oil molecules.

9. The method according to claim 1, wherein the particles include (i) aggregates of fullerenes and (ii) complexes of fullerenes and base oil molecules.

10. The method according to claim 1, wherein there is a negative correlation between the measured particle size (r) and a measured wear coefficient of the lubricating oil composition.

11. A method of inspecting a lubricating oil composition, the method comprising:

measuring a particle size (r) of particles present in the lubricating oil composition containing a base oil and a fullerene, thereby obtaining a measured particle size (r), and estimating a wear coefficient of the lubricating oil composition based on the measured particle size (r) according to a defined relationship between the measured particle size (r) and a measured wear coefficient of the lubricating oil composition, wherein the particles include at least one kind selected from the group consisting of (i) aggregates of fullerenes and (ii) complexes of fullerenes and base oil molecules and the particle size (r) of particles present in the lubricating oil composition is an average particle size (R) of the particles present in the lubricating oil composition.

12. The method according to claim 11, wherein the particle size (r) of the particles is measured by a dynamic light scattering method, a laser diffraction method, or a small-angle X-ray scattering (SAXS) method.

13. The method according to claim 11, wherein the average particle size (R) of the particles is measured by a small-angle X-ray scattering (SAXS) method.

14. The method according to claim 13, wherein the average particle size (R) of the particles is calculated from a slope of a Guinier plot.

15. The method according to claim 13, wherein the average particle size (R) of the particles is calculated from a value of a scattering vector at which the scattering intensity ratio between the lubricating oil composition and the base oil is the maximum value with respect to the scattering vector.

16. A method of producing a lubricating oil composition, the method comprising a step of sorting the lubricating oil composition by using the method according to claim 11.

17. The method according to claim 11, wherein the particles include aggregates of fullerenes.

18. The method according to claim 11, wherein the particles include complexes of fullerenes and base oil molecules.

19. The method according to claim 11, wherein the particles include (i) aggregates of fullerenes and (ii) complexes of fullerenes and base oil molecules.

20. The method according to claim 11, wherein there is a negative correlation between the measured particle size (r) and a measured wear coefficient of the lubricating oil composition.

* * * * *